US011933655B2

(12) United States Patent
Eriksson et al.

(10) Patent No.: US 11,933,655 B2
(45) Date of Patent: Mar. 19, 2024

(54) RADAR LEVEL GAUGE SYSTEM AND METHOD FOR REDUCED LOWER DEAD ZONE

(71) Applicant: Rosemount Tank Radar AB, Mölnlycke (SE)

(72) Inventors: Mikael Eriksson, Västervik (SE); Johannes Hjorth, Gothenburg (SE); Jimmie Söderström, Gothenburg (SE)

(73) Assignee: ROSEMOUNT TANK RADAR AB, Molnlycke (SE)

( * ) Notice: Subject to any disclaimer, the term of this patent is extended or adjusted under 35 U.S.C. 154(b) by 249 days.

(21) Appl. No.: 17/516,895

(22) Filed: Nov. 2, 2021

(65) Prior Publication Data
US 2022/0178730 A1 Jun. 9, 2022

(30) Foreign Application Priority Data

Dec. 3, 2020 (EP) ..................................... 20211631

(51) Int. Cl.
*G01F 23/284* (2006.01)
*G01S 7/292* (2006.01)
*G01S 13/88* (2006.01)

(52) U.S. Cl.
CPC .......... *G01F 23/284* (2013.01); *G01S 7/2922* (2013.01); *G01S 13/88* (2013.01)

(58) Field of Classification Search
CPC ....... G01F 23/284; G01S 7/2922; G01S 13/88
See application file for complete search history.

(56) References Cited

U.S. PATENT DOCUMENTS

| 9,927,280 B2 | 3/2018 | Alvarado |
| 2008/0134778 A1* | 6/2008 | Osswald ............... G01F 23/284 73/304 C |

(Continued)

FOREIGN PATENT DOCUMENTS

| EP | 2012098 A1 * | 1/2009 | ........... G01F 23/284 |
| EP | 2012098 A1 | 1/2009 | |
| WO | 2015000068 A1 | 1/2015 | |

OTHER PUBLICATIONS

Extended European Search Report from European Patent Application No. 20211631.5, dated May 19, 2021.

*Primary Examiner* — Bernarr E Gregory
*Assistant Examiner* — Hailey R Le
(74) *Attorney, Agent, or Firm* — Westman, Champlin & Koehler, P.A.

(57) ABSTRACT

In summary, the present invention thus relates to a method of determining a level of a product in a tank, comprising generating and transmitting an electromagnetic transmit signal; guiding the transmit signal towards and into the product; returning an electromagnetic reflection signal resulting from reflection of the transmit signal; receiving, the reflection signal; determining, based on the reflection signal and a timing relation between the reflection signal and the transmit signal, an echo signal exhibiting an echo signal strength as a function of a propagation parameter indicative of position along the probe; and determining the level of the surface of the product based on a propagation parameter value indicative of a first threshold position along the probe for which the echo signal has reached a predetermined threshold signal strength, and an offset indicative of an offset distance along the probe from the first threshold position towards the second probe end.

14 Claims, 7 Drawing Sheets

(56) References Cited

U.S. PATENT DOCUMENTS

| | | | |
|---|---|---|---|
| 2009/0085794 A1* | 4/2009 | Edvardsson | G01S 13/88 |
| | | | 342/124 |
| 2013/0231877 A1* | 9/2013 | Weber | G01F 23/80 |
| | | | 73/304 R |
| 2016/0187180 A1 | 6/2016 | Alvarado | |
| 2016/0266240 A1* | 9/2016 | Hughes | G01S 13/88 |
| 2018/0010948 A1* | 1/2018 | Edvardsson | G01S 13/88 |
| 2019/0128727 A1* | 5/2019 | Frövik | G01S 7/2922 |

\* cited by examiner

RADAR LEVEL GAUGE SYSTEM AND METHOD FOR REDUCED LOWER DEAD ZONE

CROSS-REFERENCE TO RELATED APPLICATION

This application claims priority to European Patent Application No. 20211631.5, filed Dec. 3, 2020, the content of which is hereby incorporated by reference in its entirety.

TECHNICAL FIELD OF THE INVENTION

The present invention relates to a radar level gauge system and to a method of determining a level of a product in a tank.

TECHNICAL BACKGROUND

Radar level gauge systems are in wide use for measuring filling levels in tanks. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a probe. The probe is generally arranged vertically in the tank. The electromagnetic signals are reflected at the surface of the product, and the reflected signals are received by a receiver or transceiver comprised in the radar level gauge system. Based on the transmitted and reflected signals, the distance to the surface of the product can be determined.

More particularly, the distance to the surface of the product is generally determined based on the time between transmission of an electromagnetic signal and receipt of the reflection thereof in the interface between the atmosphere in the tank and the product contained therein. In order to determine the actual filling level of the product, the distance from a reference position to the surface is determined based on the above-mentioned time (the so-called time-of-flight) and the propagation velocity along the probe of the electromagnetic signals.

In addition to the reflection at the interface between the atmosphere in the tank and the product (and at other material interfaces where applicable), there is typically also a reflection at the end of the probe close to the bottom of the tank. In most currently available GWR-type radar level gauge systems, this reflection at the end of the probe prevents accurate determination of filling levels close to the end of the probe. The filling level range for which accurate determination of filling levels is prevented may be referred to as the lower dead zone or blind zone.

In an effort to avoid or reduce the lower dead zone for a coaxial two conductor probe, EP 2 012 098 proposes to inductively connect the inner conductor and the outer conductor with a spiral spring at the end of the probe. The inductive connection between the inner conductor and the outer conductor delays the reflection (echo) from the probe end and, according to EP 2 012 098, the lower dead zone can be reduced or even avoided by choosing the inductance of the connection between the inner conductor and the outer conductor.

A higher inductance, however, requires a longer and/or narrower electrical connection between the inner and outer probe conductor, which may be difficult to achieve without requiring a higher precision in the manufacturing and/or sacrificing some robustness of the probe.

SUMMARY OF THE INVENTION

In view of the above, it would be desirable to provide for an improved GWR-type radar level gauge system, in particular a more robust and/or production-friendly GWR-type radar level gauge system having a reduced lower dead zone.

According to a first aspect of the present invention, it is therefore provided a method of determining a level of a product in a tank, using a radar level gauge system comprising: a transceiver; a probe arranged to extend towards and into the product from a first probe end coupled to the transceiver to a second probe end, the probe comprising a first probe conductor and a second probe conductor being conductively coupled to each other by a probe termination arrangement at the second probe end; and processing circuitry, the method comprising the steps of: generating and transmitting, by the transceiver, an electromagnetic transmit signal; guiding, by the probe, the transmit signal towards and into the product; returning, by the probe, an electromagnetic reflection signal resulting from reflection of the transmit signal at the surface of the product and at the second probe end; receiving, by the transceiver, the reflection signal; determining, based on the reflection signal and a timing relation between the reflection signal and the transmit signal, an echo signal exhibiting an echo signal strength as a function of a propagation parameter indicative of position along the probe; and determining, by the processing circuitry, the level of the surface of the product based on a propagation parameter value indicative of a first threshold position along the probe for which the echo signal has reached a predetermined threshold signal strength, and an offset indicative of an offset distance along the probe from the first threshold position towards the second probe end.

The "transceiver" may be one functional unit capable of transmitting and receiving electromagnetic signals, or may be a system comprising separate transmitter and receiver units.

The tank may be any container or vessel capable of containing a product, and may be metallic, or partly or completely non-metallic, open, semi-open, or closed.

The propagation parameter may be any parameter indicative of a position along the probe. For example, the propagation parameter may be any one of a time-of-flight of the reflection signal, a distance from a reference position at the first probe end, and a level in the tank, etc.

The present invention is based upon the realization that the lower dead zone can be reduced or even avoided without a highly inductive probe termination if the level of the surface of the product can be determined from a composite peak in the echo signal formed by a combination of the echo signal from reflection at the surface of the product and the echo signal from reflection at the second end of the probe.

The present inventors have further realized that this can be achieved by determining the level of the surface of the product, at least when the level is close to the second probe end, based on the position along the probe where the echo signal strength reaches a predetermined threshold value, and an offset distance from that position towards the second probe end.

Hereby, the probe termination arrangement can be made more robust, since the inductance can be lower without sacrificing the ability to reduce or avoid the lower dead zone. This may make the radar level gauge system less sensitive to damage and disturbances, and therefore suitable for a greater range of applications. Furthermore, the requirements on the manufacturing tolerances of the probe can be reduced, resulting in simpler and more cost-efficient manufacturing and/or installation at the tank.

The offset may advantageously be a predetermined value or may be selected among a set of predetermined values based on at least one measured property, such as a temperature, or a system specific property. Furthermore, the offset may depend on at least one material property of the second substance, such as the dielectric constant of the second substance. For example, the offset may be determined based on an estimated echo signal indicative of reflection of the transmit signal at the surface of the product only. Alternatively, or in combination, the offset may be determined based on one or several echo signals resulting from reflection of the transmit signal at the surface of the product when the surface of the product is sufficiently separated from the second probe end for the reflection at the surface of the product to result in an isolated peak in the echo signal. Such a measured isolated peak in the echo signal can be used to establish a mathematical model of the peak. The mathematical model, which may be simple (as will be described further below) or more complex can be used to determine the offset for a given threshold signal strength.

According to embodiments, furthermore, the transmit signal may comprise a first pulse train having a first pulse repetition frequency; and the method may further comprise the steps of: generating, by the transceiver, an electromagnetic reference signal in the form of a second pulse train having a second pulse repetition frequency controlled to differ from the first pulse repetition frequency by a frequency difference; and the echo signal may be determined based on the reflection signal, the reference signal, and the frequency difference.

The pulses in the first pulse train may advantageously be so-called DC-pulses.

It should be noted that the steps of methods according to embodiments of the present invention need not necessarily be carried out in any particular order, unless explicitly or implicitly required.

According to a second aspect of the present invention, it is provided a radar level gauge system for determining a level of a product in a tank, the radar level gauge system comprising: a transceiver for generating, transmitting and receiving electromagnetic signals; a probe arranged to extend towards and into the product from a first probe end coupled to the transceiver to a second probe end, the probe comprising a first probe conductor and a second probe conductor being conductively coupled to each other by a probe termination arrangement at the second probe end; echo signal forming circuitry connected to the transceiver for forming, based on the reflection signal and a timing relation between the reflection signal and the transmit signal, an echo signal exhibiting an echo signal strength as a function of a propagation parameter indicative of position along the probe; and level determining circuitry connected to the echo signal forming circuitry for determining the level of the product in the tank based on a propagation parameter value indicative of a first threshold position along the probe for which the echo signal has reached a predetermined threshold signal strength, and an offset indicative of an offset distance along the probe from the first threshold position towards the second probe end.

According to embodiments, the probe termination arrangement may provide an inductance between the first probe conductor and the second probe conductor being higher than about 1 nH and lower than about 30 nH.

By configuring the probe termination arrangement to provide an inductance in the above range, a favorable trade-off between robustness and reduction in the dead zone at the second probe end can be achieved.

Further embodiments of, and effects obtained through this second aspect of the present invention are largely analogous to those described above for the first aspect of the invention.

In summary, the present invention thus relates to a method of determining a level of a product in a tank, comprising generating and transmitting an electromagnetic transmit signal; guiding the transmit signal towards and into the product; returning an electromagnetic reflection signal resulting from reflection of the transmit signal; receiving, the reflection signal; determining, based on the reflection signal and a timing relation between the reflection signal and the transmit signal, an echo signal exhibiting an echo signal strength as a function of a propagation parameter indicative of position along the probe; and determining the level of the surface of the product based on a propagation parameter value indicative of a first threshold position along the probe for which the echo signal has reached a predetermined threshold signal strength, and an offset indicative of an offset distance along the probe from the first threshold position towards the second probe end.

BRIEF DESCRIPTION OF THE DRAWINGS

These and other aspects of the present invention will now be described in more detail, with reference to the appended drawings showing example embodiments of the invention, wherein.

DETAILED DESCRIPTION OF AN EXAMPLE EMBODIMENT OF THE INVENTION

Figure 1:
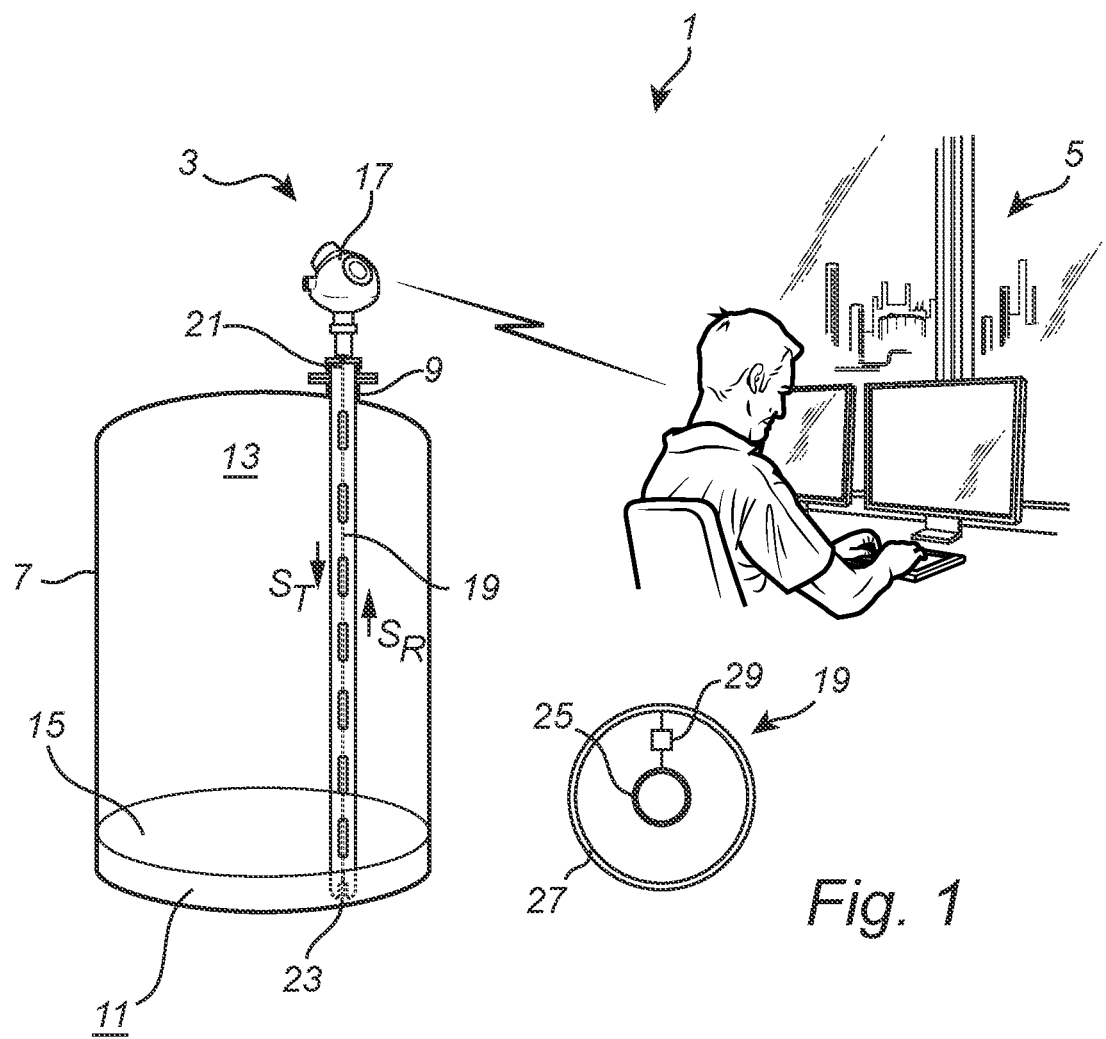
FIG. 1 schematically illustrates an exemplary tank arrangement comprising a radar level gauge system according to an embodiment of the present invention.

FIG. 1 schematically shows a level measuring system 1 comprising a radar level gauge system 3 according to an example embodiment of the present invention, and a host system 5 illustrated as a control room.

The radar level gauge system 3, which is of GWR (Guided Wave Radar) type, is arranged at a tank 7 having a tubular mounting structure 9 (often referred to as a "nozzle") extending substantially vertically from the roof of the tank 7.

In the present exemplary measurement situation, the tank 7 contains a product 11 and a tank atmosphere 13 above the product 11. The tank atmosphere 13 may be air or vapor, and the product 11 may, for example, be oil or another liquid through which electromagnetic signals can be guided by a probe.

The radar level gauge system 3 is installed to measure the level of the surface 15 of the product 11. The radar level gauge system 3 comprises a measuring electronics unit 17 arranged outside the tank 7, and a probe 19, extending from a first probe end 21 coupled to the measuring electronics unit 17, through the tubular mounting structure 9, towards and into the product 11, to a second probe end 23 at the bottom of the tank 7. In the example measurement situation in FIG. 1, the surface 15 of the product 11 is indicated as being close to the second probe end 23, at a level that may be inside the so-called lower dead zone or blind zone for various existing radar level gauge systems.

As is schematically indicated in FIG. 1, in particular in the enlarged schematic functional view from the second end 23 of the probe 19, the probe 19 has a first probe conductor 25, a second probe conductor 27, and a probe termination arrangement 29 conductively coupling the first probe conductor 25 to the second probe conductor 27.

In the example embodiment in FIG. 1, the probe 19 is shown in the form of a large coaxial probe with the first probe conductor 25 being an inner conductor and the second probe conductor 27 being a coaxially arranged outer conductor. It should, however, be noted that the probe 19 may alternatively be any other kind of probe comprising first 25 and second 27 probe conductors, such as a twin line transmission line probe, with parallelly extending wires or rods, or an "ordinary" coaxial probe with a smaller diameter of the outer conductor (and the inner conductor) than the large coaxial probe in FIG. 1. Furthermore, while the probe termination arrangement 29 is conceptually indicated in FIG. 1, the skilled person will realize that there are many possible ways of implementing the probe termination arrangement 29. Some representative examples of probe termination arrangements that may be suitable for various embodiments of the radar level gauge system 3 will be described further below with reference to FIGS. 7A-D.

In operation, an electromagnetic transmit signal $S_T$ is transmitted and guided by the probe 19 towards and into the product 11. An electromagnetic reflection signal $S_R$ is returned, by the probe 19. Based on the reflection signal and a timing relation between the reflection signal and the transmit signal, the measurement unit 17 can determine the level of the surface 15. The radar level gauge system in FIG. 1 will now be described in more detail with reference to the schematic block diagram in FIG. 2.

Figure 2:
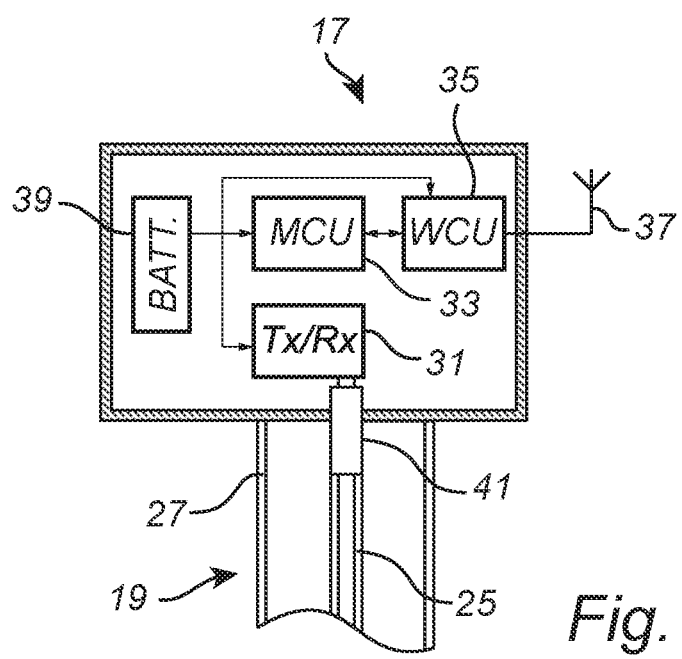
FIG. 2 is schematic illustration of the measurement unit comprised in the radar level gauge system in FIG. 1.

Referring to the schematic block diagram in FIG. 2, the measurement unit 6 of the radar level gauge system 2 in FIG. 1 comprises a transceiver 31, a measurement control unit (MCU) 33, a wireless communication control unit (WCU) 35, a communication antenna 37, an energy store, such as a battery 39, and a feed-through 41 between the outside and the inside of the tank 7.

As is schematically illustrated in FIG. 2, the MCU 33 controls the transceiver 31 to generate, transmit and receive electromagnetic signals. The transmitted signals pass through the feed-through 31 to the inner probe conductor 25 of the probe 19, and the received signals pass from the probe 19 through the feed-through 41 to the transceiver 31.

The MCU 33 may determine the level of the surface 15 of the product 11, and provide a value indicative of the level to an external device, such as the control center 5 in FIG. 1, from the MCU 33 via the WCU 35 through the communication antenna 37. The radar level gauge system 1 may, for example, be configured according to the so-called WirelessHART communication protocol (IEC 62591).

Although the measurement unit 17 is shown to comprise an energy store 39 and to comprise devices (such as the WCU 35 and the communication antenna 37) for allowing wireless communication, it should be understood that power supply and communication may be provided in a different way, such as through communication lines (for example 4-20 mA lines).

The local energy store need not (only) comprise a battery, but may alternatively, or in combination, comprise a capacitor or super-capacitor.

The radar level gauge system 3 in FIG. 1 will now be described in greater detail with reference to the schematic block diagram in FIG. 3.

Figure 3:
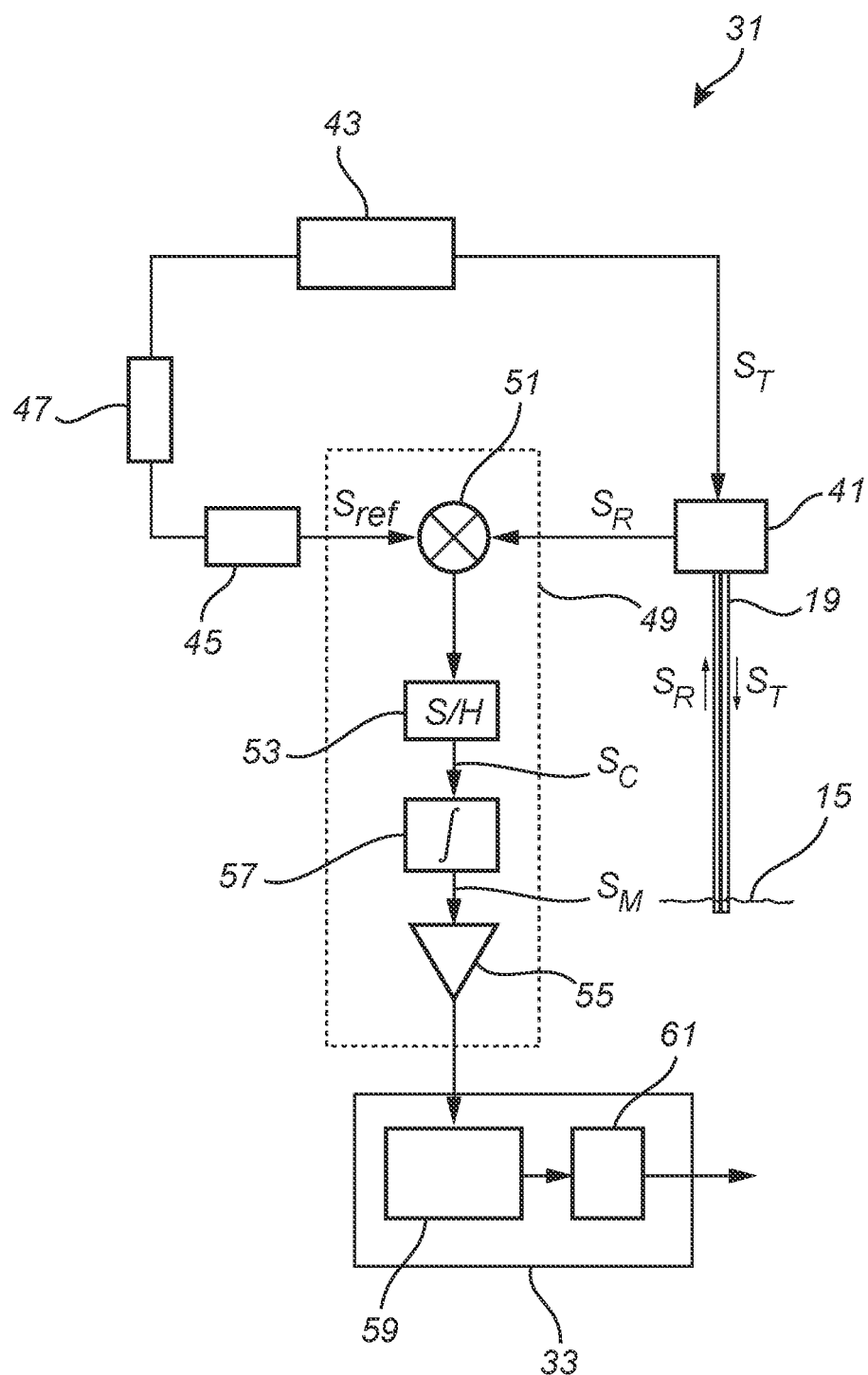
FIG. 3 is a partial schematic block diagram of the radar level gauge system according to an embodiment of the present invention.

Referring now to FIG. 3, there is shown a more detailed block diagram of the exemplary transceiver 31 in FIG. 2.

As is schematically shown in FIG. 3, the transceiver 31 comprises a transmitter branch for generating and transmitting the transmit signal $S_T$, and a receiver branch for receiving and operating on the reflection signal $S_R$. As is indicated in FIG. 3, the transmitter branch and the receiver branch are both connected to a directional coupler 41 to direct signals from the transmitter branch to the probe 19 and to direct reflected signals being returned by the probe 19 to the receiver branch.

As is schematically indicated in FIG. 3, the transceiver 31 comprises pulse generating circuitry, here in the form of a first pulse forming circuit 43, a second pulse forming circuit 45, and a timing control unit 47 for controlling the timing relationship between the transmit signal output by the first pulse forming circuit 43 and the frequency shifted reference signal $S_{REF}$ output by the second pulse forming circuit 45.

The transmitter branch comprises the first pulse forming circuit 43, and the receiver branch comprises the second pulse forming circuit 45 and measurement circuitry 49.

As is schematically indicated in FIG. 3, the measurement circuitry 49 comprises a time-correlator, here in the form of a mixer 51, a sample-and-hold circuit 53 and amplifier circuitry 55. In embodiments of the present invention, the measurement circuitry 49 may further comprise an integrator 57.

Additionally, as was briefly described above with reference to FIG. 2, the radar level gauge system 3 comprises processing circuitry 33 that is connected to the measurement circuitry 49 for determining the level of the surface 15 of the product 11 in the tank 7.

When the radar level gauge system 3 is in operation to perform a filling level determination, a time correlation is performed in the mixer 51 between the reflection signal $S_R$ and the reference signal $S_{REF}$ that is output by the second pulse forming circuit 45. The reference signal $S_{REF}$ is a pulse train with a pulse repetition frequency that controlled to differ from the pulse repetition frequency of the transmit signal $S_T$, by a predetermined frequency difference $\Delta f$. When a measurement sweep starts, the reference signal $S_{REF}$ and the transmit signal $S_T$ are in phase, and then parameter values indicative of a time correlation between the reference signal and the reflected signal $S_R$ are determined to form an echo signal, together with the frequency difference $\Delta f$. Based on an analysis of the echo signal, level of the surface 15 of the product 11 in the tank 7 can be determined, as will be described further below.

The time-expansion technique that was briefly described in the previous paragraph is well known to the person skilled in the art, and is widely used in pulsed radar level gauge systems.

As is clear from the above discussion, the output from the mixer 51 will be a sequence of values, where each value represents a time correlation between a pulse of the reference signal $S_{REF}$ and the reflection signal $S_R$. The values in this sequence of values are tied together to form a continuous signal using the sample-and-hold circuit 53.

In this context it should be noted that the sample-and-hold circuit 53 is simply an illustrative example of a device capable of maintaining a voltage level over a given time, and that there are various other devices that can provide the desired functionality, as is well known to the person skilled in the art.

In the example embodiment of FIG. 3, the time-correlated signal—the correlation signal $S_C$—output from the sample-and-hold circuit 53 is provided to an integrator to form a measurement signal $S_M$, which is amplified by the low noise amplifier LNA 55. The above-mentioned echo signal can be formed, by echo signal forming circuitry 59, based on the measurement signal $S_M$ and the frequency difference $\Delta f$. The filling level of the product 11 (the level of the surface 15) can, according to embodiments of the present invention, be determined by the level determining circuitry 61. Along a segment of the probe 19 that is neither close to the first 21 nor the second 23 probe end, the filling level may be determined using conventional methods.

According to example embodiments of the present invention, the filling level close to the second probe end 23 may be determined in accordance with the method described below, with reference to the schematic flow-chart in FIG. 4 and further reference to other figures as indicated.

In step 401, the transmit signal $S_T$ is generated as a pulse train of transmit pulses, and transmitted by the transceiver 31.

In step 402, taking place at the same time as step 401, the reference signal $S_{REF}$ is generated as a pulse train of reference pulses.

In step 403, the transmit signal $S_T$ is guided by the probe 19 towards and into the product 11 in the tank 7.

In step 404, the reflection signal $S_R$ resulting from reflection of the transmit signal $S_T$ at impedance transitions encountered thereby is returned by the probe 19 and received by the transceiver 31. Notably, the impedance transitions encountered by the transmit signal $S_T$ include impedance transitions provided by the surface 15 of the product 11 and the probe termination arrangement 29 at the second probe end 23. For further illustration of the above-described steps 401 to 404, FIGS. 5A-B are now referred to.

Figure 5A:
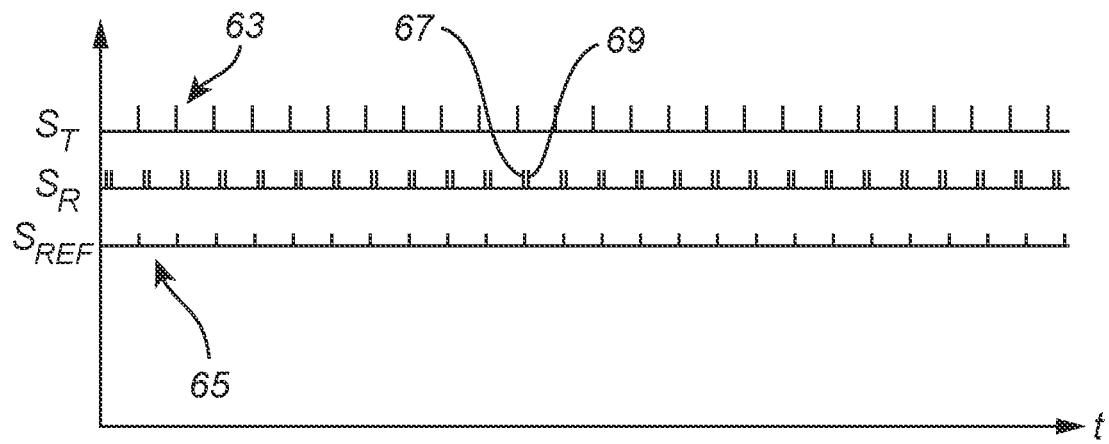
FIG. 5A schematically illustrates examples of the transmit signal, the reflection signal and the reference signal.
Figure 5B:
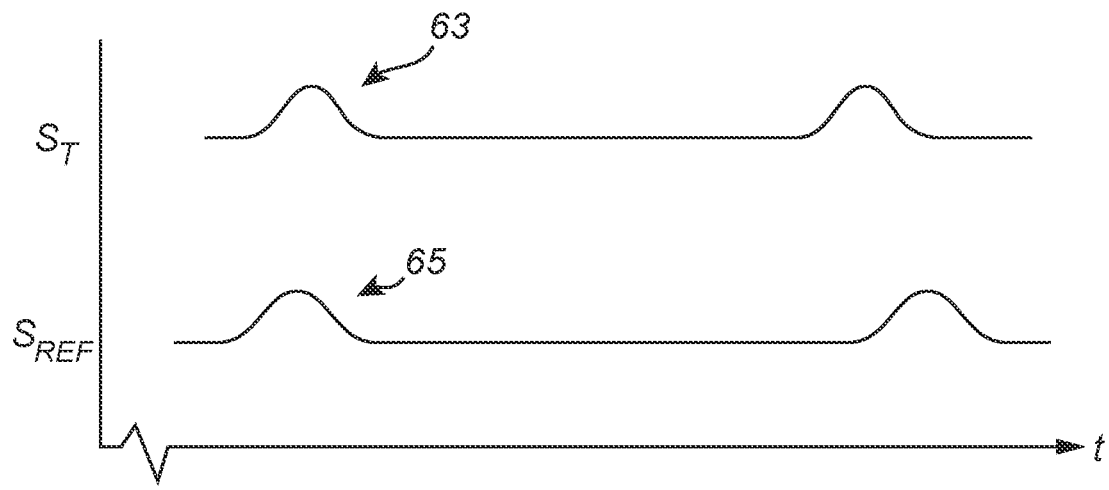
FIG. 5B is a partial enlarged view of a portion of the transmit signal and the reference signal in FIG. 5A.

FIG. 5A is a simplified timing diagram schematically showing the relative timing of the transmit signal $S_T$, the reflected signal $S_R$, and the reference signal $S_{REF}$ according to an example embodiment of the invention.

As is schematically indicated in FIG. 5A, the transmit signal $S_T$, formed by transmit pulses 63, and the reference signal $S_{REF}$, formed by reference pulses 65, are controlled by the timing control unit 47 to be in phase at the start of the measurement sweep. A full measurement sweep may typically be defined by the difference frequency $\Delta f$, since the transmit signal $S_T$ and the reference signal $S_{REF}$, in this particular example, need to be in phase at the start of a new measurement sweep. As is also schematically indicated in FIG. 5A, the reflection signal $S_R$ here comprises a first set of reflection pulses 67 resulting from reflection of the transmit pulses 63 at the surface 15 of the product 11, and a second set of reflection pulses 69 resulting from reflection of the transmit pulses 63 by the impedance transition provided by the probe termination arrangement 29 at the second probe end 23. Each of the first 67 and second 69 set of reflection pulses has the same pulse repetition frequency as the transmit signal $S_T$, but lags behind the transmit signal $S_T$ with a time corresponding to the time-of-flight indicative of the electrical distance to the surface 15 of the product and the probe termination arrangement 29, respectively.

The reference signal $S_{REF}$ is initially in phase with the transmit signal $S_T$, but will, due to its lower pulse repetition frequency "run away from" the transmit signal $S_T$ and "catch up with" the surface reflection signal $S_R$.

When the time-varying phase difference between the transmit signal $S_T$ and the reference signal $S_{REF}$ corresponds to the time-of-flights of the reflection pulses of the reflection signal $S_R$, there will be a time-correlation between pulses of the reference signal $S_{REF}$ and pulses of the surface reflection signal $S_R$. This time-correlation results in a time-expanded correlation signal $S_C$, which can, in turn, be converted to a measurement signal $S_M$.

Example waveforms of the transmit pulses 63 and the reference pulses 65 are provided in the schematic magnified view in FIG. 5B.

Figure 4:
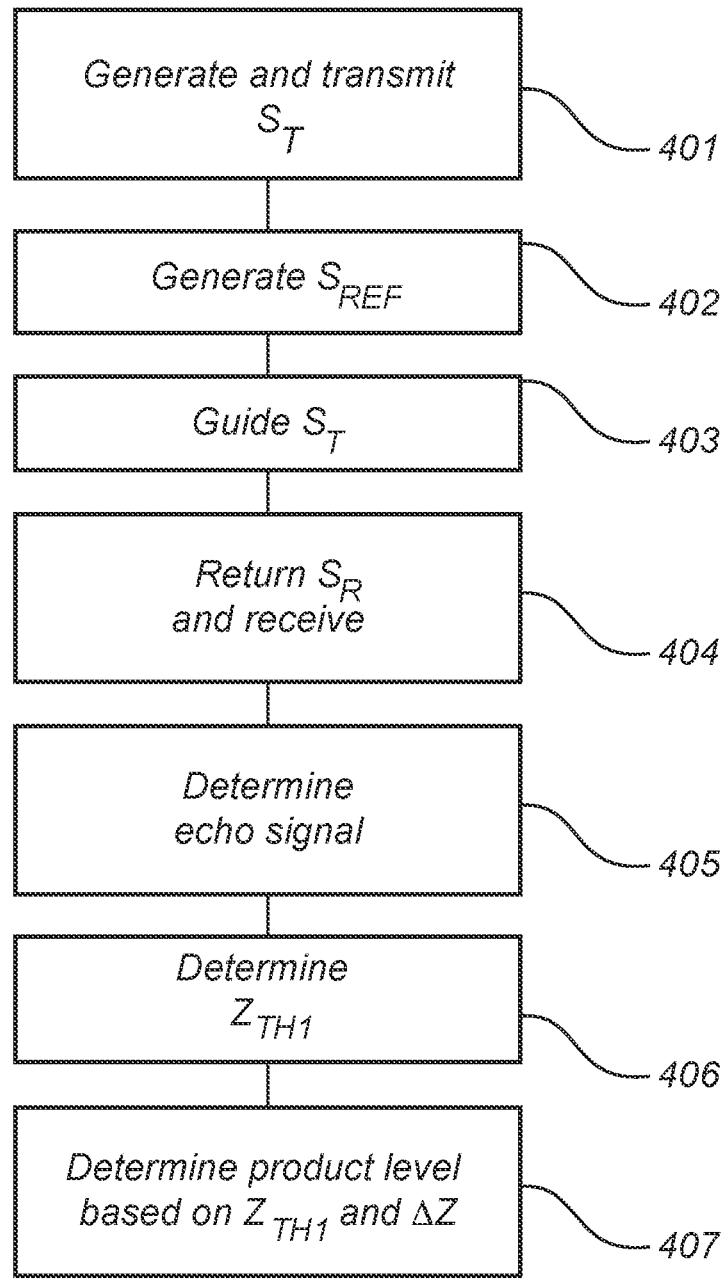
FIG. 4 is a flow-chart schematically illustrating an example embodiment of the method according to the present invention.

Returning to the flow-chart in FIG. 4, the echo signal is determined, in step 405, by the echo signal forming circuitry 59, based on the reflection signal and a timing relation between the reflection signal and the transmit signal. For example, the echo signal may advantageously be determined based on the above-mentioned time-expanded measurement signal $S_M$ and the frequency difference $\Delta f$.

The above thorough explanation was provided for the case of a so-called pulsed measurement technique. The echo signal may alternatively be determined using other techniques, in which a frequency modulated transmit signal is used, as will be apparent to those of skilled in the art of radar level gauging.

An example of the echo signal, for an exemplary measurement situation where the surface 15 of the product 11 is close to the second probe end 23 of the probe 19, will now be described with reference to FIGS. 6A-B.

Figure 6A:
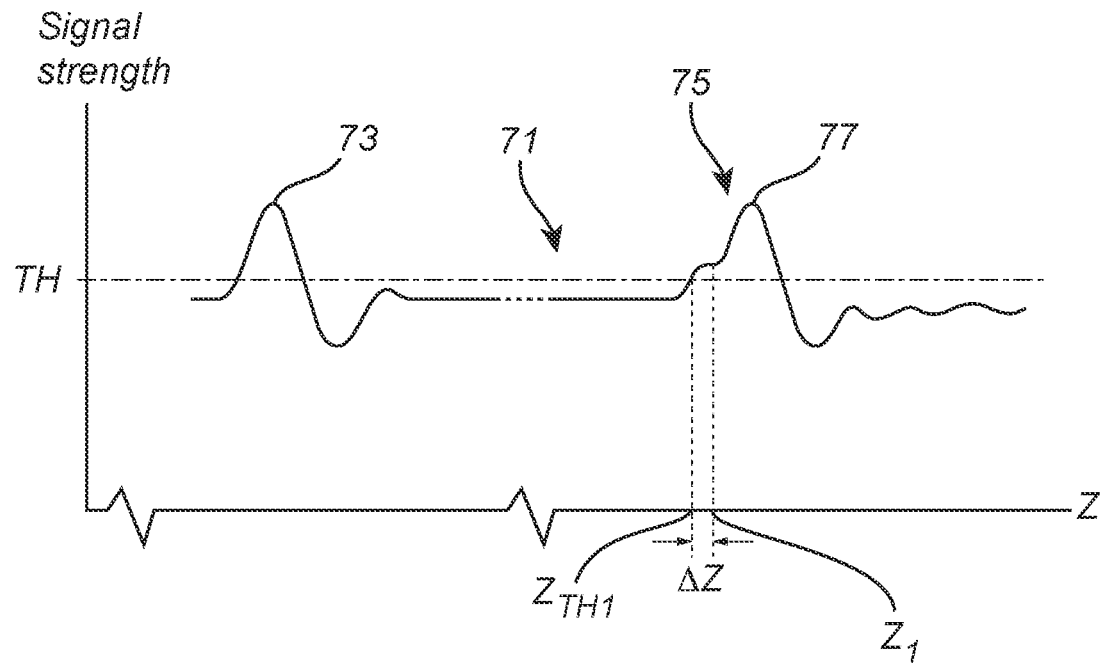
FIGS. 6A-B schematically illustrate the echo signal resulting from time-correlation of the surface reflection signal and the reference signal in FIG. 4A for an example situation where the surface of the product in the tank is close to the second end of the probe.

FIG. 6A schematically shows an echo signal 71 exhibiting an echo signal strength (or amplitude) as a function of a propagation parameter indicative of position along the probe 19. In this case, the chosen propagation parameter is position z along the probe in relation to a reference position at the first probe end 21. FIG. 6B is an enlarged view of a portion of the echo signal 71 indicating reflection by the impedance transitions provided by the surface 15 of the product 11 and the probe termination arrangement 29 at the second probe end 23 of the probe 19.

As is schematically shown in FIG. 6A, the echo signal 71 indicates a reference echo 73 resulting from reflection of the transmit signal $S_T$ at a reference impedance transition (such as the feed-through 41) at the first probe end 21, and a composite peak 75 formed by a combination of the echo signals from reflection at the impedance transitions provided by the surface 15 of the product 11 and the probe termination arrangement 29 at the second probe end 23.

Figure 6B:
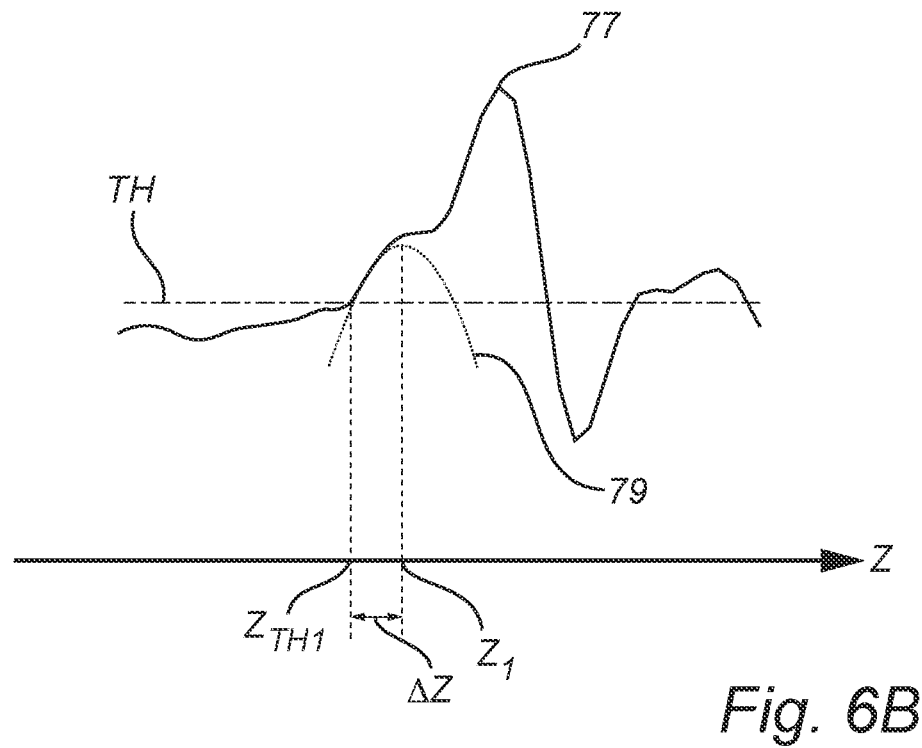

As is schematically shown in FIGS. 6A-B, the composite peak 75 is a broad and asymmetrical echo peak that only exhibits a single local extremum (maximum) 77, so that the surface 15 of the product 11 and the second probe end 23 cannot be distinguished based on conventional peak detection. If conventional peak detection were used, the product level 15 in this example would be considered to be in the lower dead zone.

Returning to the flow-chart in FIG. 4, the level of the surface 15 of the product 11 in the tank 7 is instead determined using the procedure described below.

In step 406, a first threshold position $z_{TH1}$ along the probe for which the echo signal 71 has reached a predetermined threshold signal strength TH is determined.

The first interface level is then determined, in step 407, based on the first threshold position $z_{TH1}$ and a predetermined offset distance $\Delta z$ along the probe 19 from the first threshold position $z_{TH1}$ towards the second probe end 23.

The predetermined offset distance $\Delta z$ is determined based on a model of the expected reflection of the transmit signal $S_T$ at the surface 15 of the product 11 only, and/or on previous test measurements. The echo pulse shape of the reflection at the surface 15 can be calculated based on known propagation properties of the probe 19 and the dielectric constants of the tank atmosphere 13 and the product 11 in the tank 7.

For the case where the tank atmosphere 13 is air, the product 11 is oil, and the probe 19 is an exemplary coaxial probe, the shape of the echo pulse 79 from reflection at the surface 15 only can be approximated by the general curve shape expression:

$$f(x) = \text{SummitAmplitude} \cdot (1 - Qx^2),$$

where $Q \approx 100$.

It should be noted that the value of Q depends on the particular configuration of the radar level gauge system 3, and that it may be temperature dependent. For an example configuration, the Q-value may be selected from values in the range 80-120, depending on the temperature.

This means that the offset distance $\Delta z$ can be determined according to the following relation:

$$\Delta z = \sqrt{\frac{1 - \frac{TH}{SummitAmplitude}}{Q}}$$

The position along the probe 19 of the surface 15 of the product 11 in relation to the reference impedance transition (such as the feed-through 41) then becomes:

$$z_1 = z_{TH1} + \Delta z$$

The level of the surface 15 can be determined based on the position $z_1$ (distance along the probe 19 from the reference impedance transition), and the known position of the reference position impedance (such as the feed-through 41).

FIGS. 7A-D show example configurations of the probe termination arrangement 29 comprised in the radar level gauge system in FIG. 1. A suitable probe termination arrangement 29 should be easy to mount to the probe 19 at the second probe end 23, and it should be mechanically and electrically robust. In particular, it should maintain its electrical properties even if subjected to harsh environments and vibrations etc. Advantageous electrical properties for a substantial reduction of the lower dead zone may be that the probe termination arrangement 29 provides an inductance between the first probe conductor 25 and the second probe conductor 27 being higher than 1 nH. To keep the probe termination arrangement 29 as mechanically robust as desired, it may be beneficial to configure the probe termination arrangement 29 to provide an inductance below about 30 nH. The different exemplary probe termination arrangement configurations shown in FIGS. 7A-D all provide an inductance of about 5-15 nH when installed in a "Large Coaxial Probe" with an outer diameter of the outer conductor 27 being 42 mm.

Figure 7A:
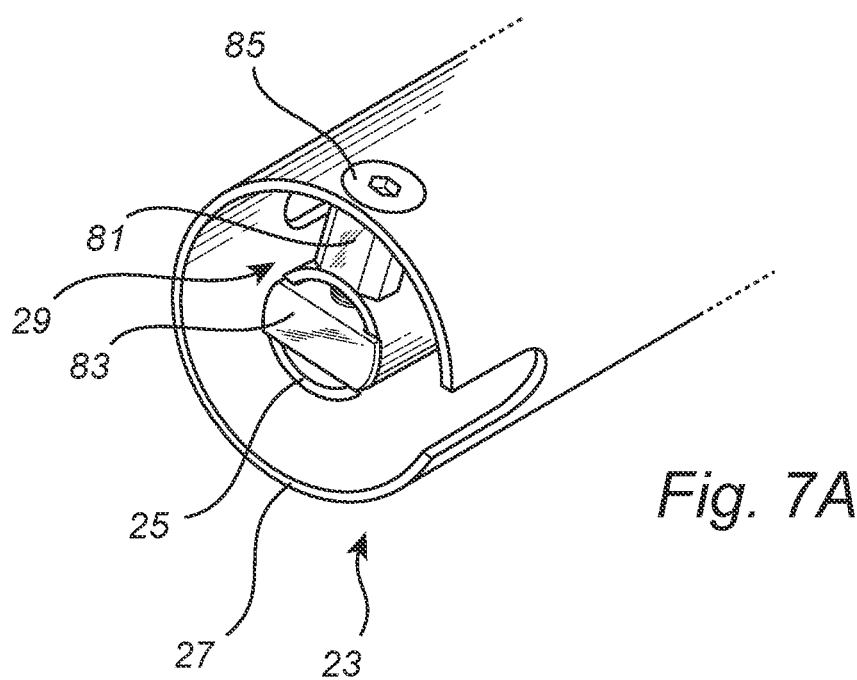
FIGS. 7A-D show example configurations of the probe termination arrangement comprised in the radar level gauge system in FIG. 1.

The first example configuration of the probe termination arrangement 29 shown in FIG. 7A comprises an electrically conductive member 81 that is attached to the first probe conductor 25 and to the second probe conductor 27. In this first example configuration, the electrically conductive member is provided in the form of a metal sleeve that is conductively and mechanically connected to the first probe conductor 25 and the second probe conductor 27 by inserting a nut 83 in the first probe conductor 25, passing a bolt 85 through a hole in the second probe conductor 27, the metal sleeve, and a hole in the first probe conductor 25, and joining the bolt 85 and the nut 83 to press the metal sleeve between the outer surface of the inner conductor 25 and the inner surface of the outer conductor 27.

Figure 7B:
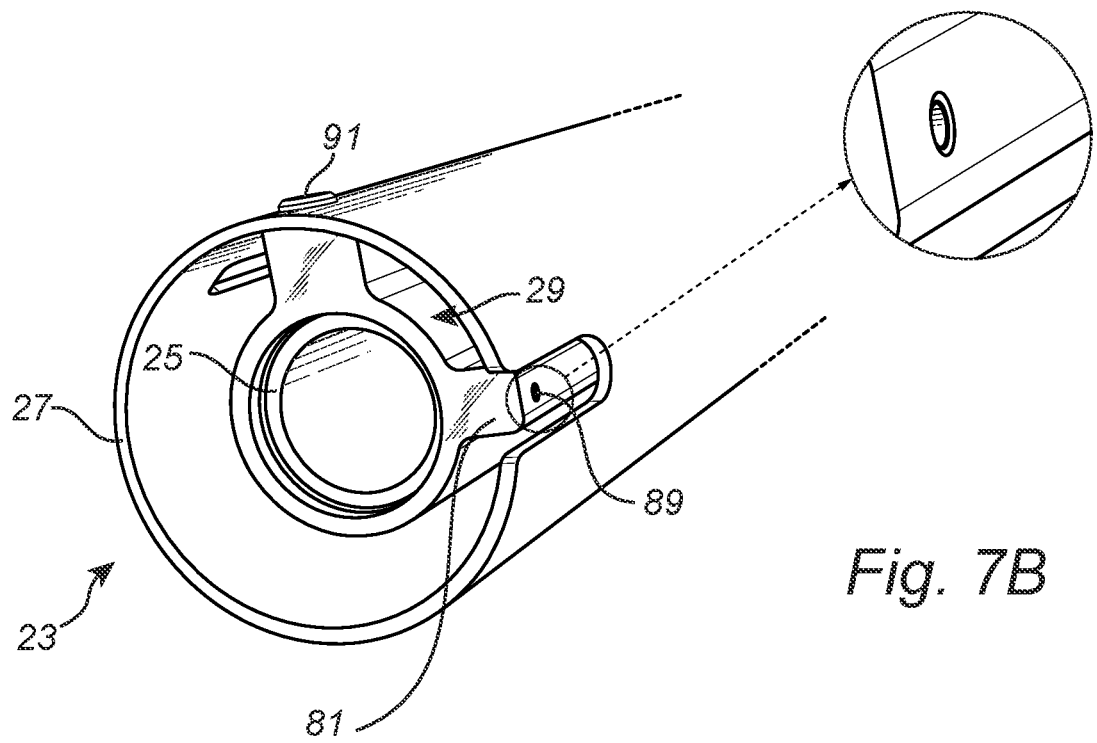

The second example configuration of the probe termination arrangement 29 shown in FIG. 7B comprises an electrically conductive member that is attached to the first probe conductor 25 and to the second probe conductor 27. In this second example configuration, the electrically conductive member 81 is provided in the form of a metal sleeve accommodating the first probe conductor 25. The metal sleeve is conductively and mechanically connected to the first probe conductor 25 by a fixing screw 89 (inside the hole in FIG. 7B) and to the second probe conductor 27 by a screw 91. To allow for bigger tolerances in manufacturing and/or assembly, the longitudinal extension of the electrically conductive member 81 (metal sleeve) may be at least 10 mm.

Figure 7C:
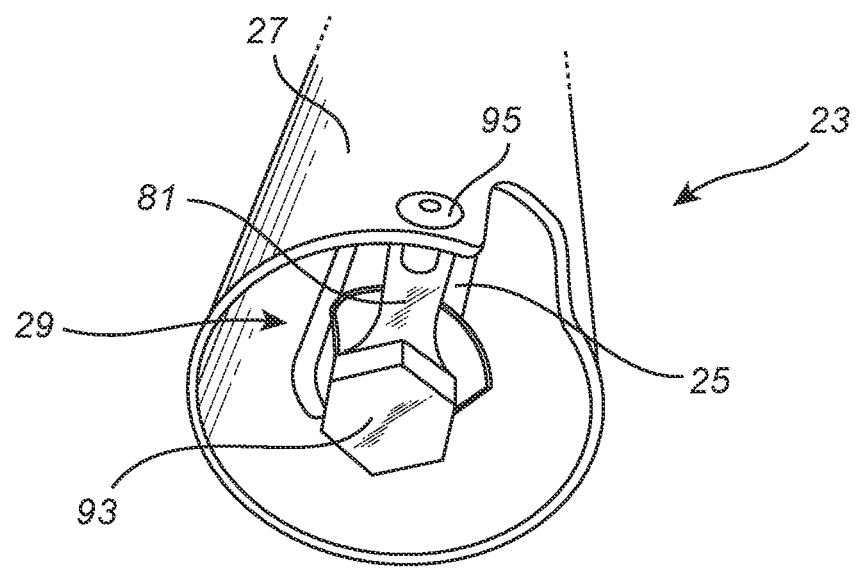

In the third example configuration of the probe termination arrangement 29 shown in FIG. 7C, the electrically conductive member 81 is conductively and mechanically connected to the first probe conductor 25 by a bolt 93 and to the second probe conductor 27 by a rivet 95.

Figure 7D:
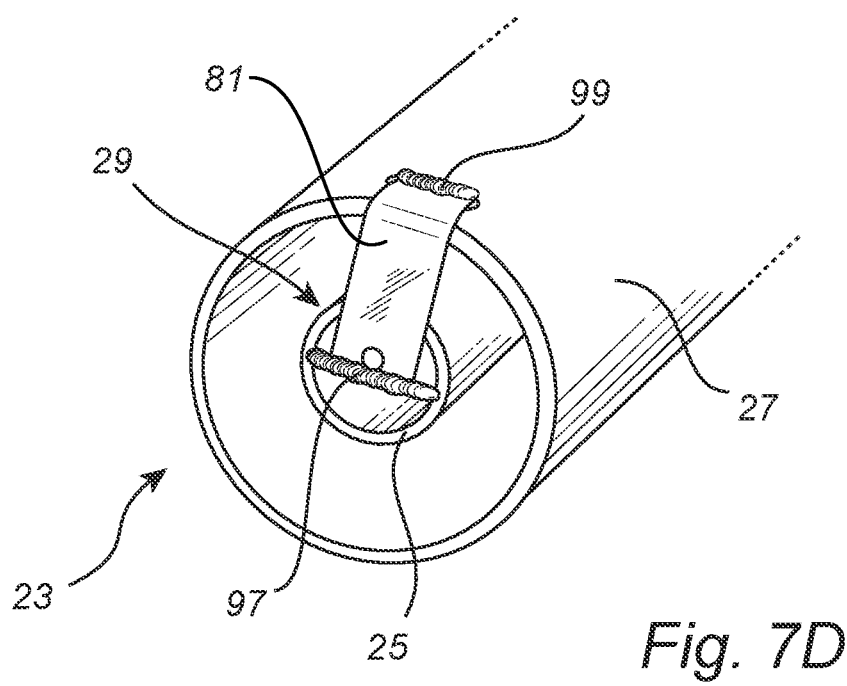

In the third example configuration of the probe termination arrangement 29 shown in FIG. 7D, the electrically conductive member 81 is conductively and mechanically connected to the first probe conductor 25 by a first weld 97 and to the second probe conductor 27 by a second weld 99.

The person skilled in the art realizes that the present invention by no means is limited to the preferred embodiments described above. For example, other probe configurations and other substances in the stratified substance composition may result in different selections of the threshold signal strengths and different estimations of the offset distances.

The invention claimed is:

1. A method of determining a level of a product in a tank, using a radar level gauge system comprising:
   a transceiver;
   a probe arranged to extend towards and into the product from a first probe end coupled to the transceiver to a second probe end, the probe comprising a first probe conductor and a second probe conductor being conductively coupled to each other by a probe termination arrangement at the second probe end; and
   processing circuitry,
   the method comprising the steps of:
   generating and transmitting, by the transceiver, an electromagnetic transmit signal;
   guiding, by the probe, the transmit signal towards and into the product;
   returning, by the probe, an electromagnetic reflection signal resulting from reflection of the transmit signal at the surface of the product and at the second probe end;

receiving, by the transceiver, the reflection signal;
determining, based on the reflection signal and a timing relation between the reflection signal and the transmit signal, an echo signal exhibiting an echo signal strength as a function of a propagation parameter indicative of position along the probe; and
determining, by the processing circuitry, the level of the surface of the product based on a propagation parameter value indicative of a first threshold position along the probe for which the echo signal has reached a predetermined threshold signal strength, and an offset indicative of an offset distance along the probe from the first threshold position towards the second probe end.

2. The method according to claim 1, further comprising the step of:
receiving a temperature parameter value indicative of a present temperature in the tank; and
determining the offset based on the present temperature.

3. The method according to claim 1, wherein the offset is based on at least one material property of the product.

4. The method according to claim 1, wherein the offset is based on at least one previously determined echo signal.

5. The method according to claim 1, wherein:
the transmit signal comprises a first pulse train having a first pulse repetition frequency; and
the method further comprises the steps of:
generating, by the transceiver, an electromagnetic reference signal in the form of a second pulse train having a second pulse repetition frequency controlled to differ from the first pulse repetition frequency by a frequency difference; and
the echo signal is determined based on the reflection signal, the reference signal, and the frequency difference.

6. A radar level gauge system for determining a level of a product in a tank, the radar level gauge system comprising:
a transceiver for generating, transmitting and receiving electromagnetic signals;
a probe arranged to extend towards and into the product from a first probe end coupled to the transceiver to a second probe end, the probe comprising a first probe conductor and a second probe conductor being conductively coupled to each other by a probe termination arrangement at the second probe end;
echo signal forming circuitry connected to the transceiver for forming, based on the reflection signal and a timing relation between the reflection signal and the transmit signal, an echo signal exhibiting an echo signal strength as a function of a propagation parameter indicative of position along the probe; and
level determining circuitry connected to the echo signal forming circuitry for determining the level of the product in the tank based on a propagation parameter value indicative of a first threshold position along the probe for which the echo signal has reached a predetermined threshold signal strength, and an offset indicative of an offset distance along the probe from the first threshold position towards the second probe end.

7. The radar level gauge system according to claim 6, wherein the probe termination arrangement provides an inductance between the first probe conductor and the second probe conductor being higher than 1 nH.

8. The radar level gauge system according to claim 7, wherein the probe termination arrangement provides an inductance between the first probe conductor and the second probe conductor being lower than 30 nH.

9. The radar level gauge system according to claim 6, wherein the probe termination arrangement comprises an electrically conductive member attached to the first probe conductor and to the second probe conductor.

10. The radar level gauge system according to claim 9, wherein the electrically conductive member is conductively and mechanically connected to the first probe conductor and to the second probe conductor by at least one of welding, screwing, riveting and spring forces.

11. The radar level gauge system according to claim 9, wherein the electrically conductive member has an extension of at least 10 mm in a longitudinal direction of the probe.

12. The radar level gauge system according to claim 6, wherein the probe is a coaxial probe having an inner conductor and an outer conductor.

13. The radar level gauge system according to claim 6, wherein:
the radar level gauge system further comprises temperature indicating circuitry for indicating a temperature parameter value indicative of a present temperature in the tank; and
the level determining circuitry is further configured to determining the first offset based on the temperature parameter value.

14. The radar level gauge system according to claim 6, wherein:
the transceiver comprises:
transmission signal generating circuitry for generating the transmit signal in the form of a first pulse train having a first pulse repetition frequency; and
reference signal generating circuitry for generating an electromagnetic reference signal in the form of a second pulse train having a second pulse repetition frequency controlled to differ from the first pulse repetition frequency by a frequency difference; and
the echo signal forming circuitry is configured to form the echo signal based on the reflection signal, the reference signal, and the frequency difference.

* * * * *